March 18, 1924.
J. S. BOOTH
ADJUSTABLE PEDAL
Filed June 18, 1923
1,487,197
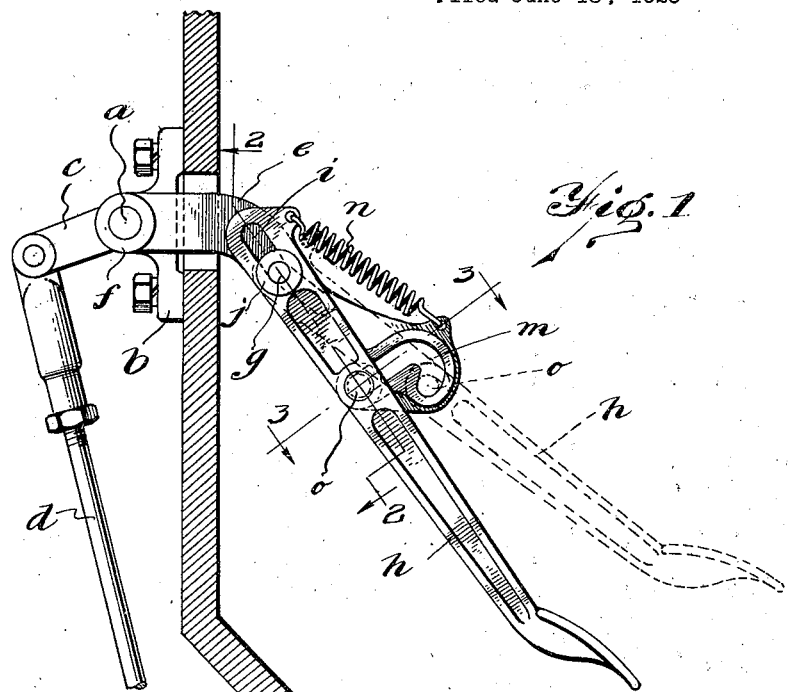
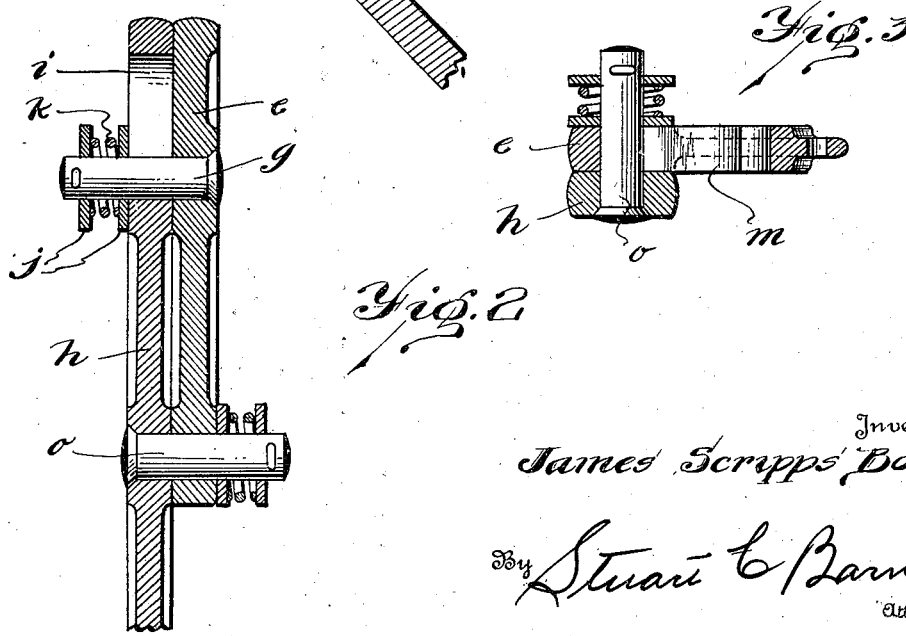
Inventor
James Scripps Booth
By Stuart E Barnes
Attorney Patented Mar. 18, 1924.

1,487,197

UNITED STATES PATENT OFFICE.

JAMES SCRIPPS BOOTH, OF DETROIT, MICHIGAN.

ADJUSTABLE PEDAL.

Application filed June 18, 1923. Serial No. 646,122.

*To all whom it may concern:*

Be it known that I, JAMES SCRIPPS BOOTH, a citizen of the United States, residing at Detroit, in the county of Wayne and State of Michigan, have invented certain new and useful Improvements in Adjustable Pedals, of which the following is a specification.

This invention relates to pedals and has for its object a quickly adjustable pedal for drivers of different stature.

Passenger cars are now quite frequently driven by several different members of the family, often of different stature. It is not broadly new to provide an adjustable pedal but most have required the loosening up some device such as a bolt or nut before the adjustment can be made. Inasmuch as the pedals are located in a very inaccessible place, devices of this kind are very unhandy and usually, the operator prefers to suffer the inconvenience of the lack of adjustment of the pedal to his stature rather than make the adjustment. The object of the present invention is to do away with the inconvenience and afford a pedal that can be quickly adjusted by simply grasping the pedal surface and manipulating the same.

In the drawings:

Fig. 1 is a side elevation of a pedal of my improved kind, showing in dotted lines the position of the pedal for an operator of short stature.

Fig. 2 is a section on the line 2—2 of Fig. 1.

Fig. 3 is a section on the line 3—3 of Fig. 1.

The pedal lever is fulcrumed at $a$ on the front of the dash, on a bracket $b$. A shaft $a$ operates a crank arm $c$ whose end is connected with the draft rod $d$ for operating the brake or other control.

The fulcruming of the pedal lever on the dash of the car is rather unusual, but is not new with me. This form of supporting the pedal is much better adapted to the use of my invention than the ordinary way of fulcruming a pedal under the floor boards of the car and using a crooked type of lever. However, I do not limit myself to this form of lever as it will be apparent that with a few modifications, my invention is applicable to the ordinary type of lever.

The brake lever I employ comprises a hub lever part $e$ which is an integral part of the hub $f$, and into which is riveted a pin $g$. The pedal part of the lever is designated $h$ and is provided at its inner end with an elongated slot $i$ adapted to permit the passage of the pin $g$. A pair of washers $j$, and a coiled spring $k$ bringing pressure against the pedal part of the lever to hold it firmly to the other part so as to prevent rattling. The part $e$ of the lever terminates with a web-like end provided with an inverted J-shaped slot $m$. A tractile spring $n$ connects the end of the pedal part with the web and the J-shaped slot is so arranged with respect to the draft of this spring that the spring tends to keep the pin $o$ which is secured to the pedal part at either one end or the other of the J-shaped slot. It will be also noticed that with a pedal of this character, gravity and also the pressure of the foot upon the pedal tends to keep the pin at either one or the other end of the slot. The J-shaped slot is not absolutely necessary; the idea is to have a slot having one or more notches in which the pin may be rested, in combination with an abutment intervening between the two notches which in conjunction with the action of the spring, tends to keep the pin seated in the notch selected for it.

It will be readily seen that the operator may grasp the pedal part of the lever by the hand, lift up on it to overcome the pull of the spring, and seat it in the other notch thereby changing the position of the pedal to more nearly accord with the stature of the driver.

What I claim is:

1. In an adjustable pedal, a two-part lever having the two parts provided with an interengagement consisting of a pin and a plurality of notches the pin being engageable in a selected notch to alter the adjustment of the pedal, and means for holding the pin in such selected notch.

2. In an adjustable pedal, a two-part lever having a connection between the two parts, including a spring that holds the parts in a position of adjustment, said parts being disengageable to secure a different adjustment by overcoming the stress of the spring.

3. In an adjustable pedal, the combination of a two-part lever in which the two parts have a connection, including a spring, a pin, and a slot provided with a plurality of notches, the spring serving to hold the pin in the notches but permitting the re-adjustment of the pedal by overcoming the tension of the spring and setting the pin again in a different notch.

4. In an adjustable pedal, a two-part lever including a part provided with a pin, and with a slot having a plurality of notches, and a pedal part having an elongated slot straddling the said pin and provided with a second pin which engages in the notched slot of the other part, and a spring tending to hold the pin of the pedal part in the notch assigned to it.

5. In an adjustable pedal, a two-part lever, including a hub part and a pedal part, the hub part provided with an inverted J-shaped slot, the pedal part provided at its inner end with a sliding connection with the hub part and a pin engaging in the inverted J-shaped slot, and a spring between the end of the hub part and the end of the pedal part tending to keep the parts in given position of adjustment.

6. In an adjustable pedal, a two-part lever including a hub part provided with a pin and having its end in the form of a widened web provided with an inverted J-shaped slot, the intermediate portion of said hub part being provided with a pin, and a pedal part provided at its end with an elongated slot for fitting over said pin and provided with an intermediate portion with a pin arranged to engage in said inverted J-shaped slot, and a tractile spring engaging between the end of the hub part of the lever and the end of the pedal part of the lever.

In testimony whereof I affix my signature.

JAMES SCRIPPS BOOTH.